Nov. 21, 1933.  A. M. NYBERG  1,936,116
VEGETABLE GRADER
Filed June 30, 1930
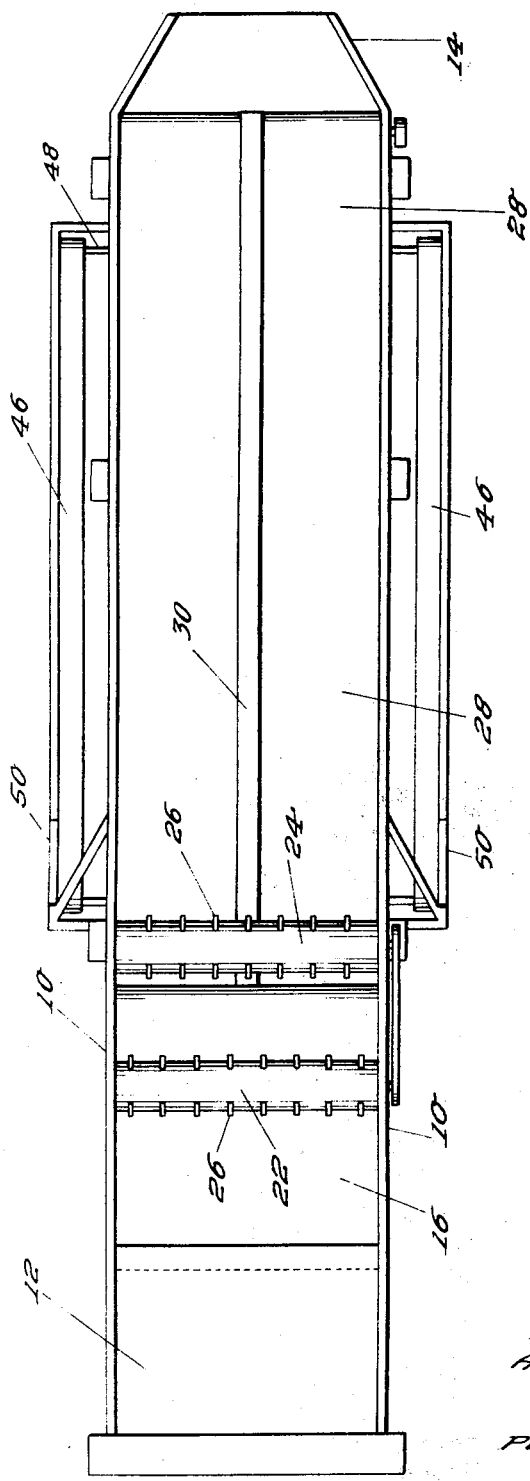
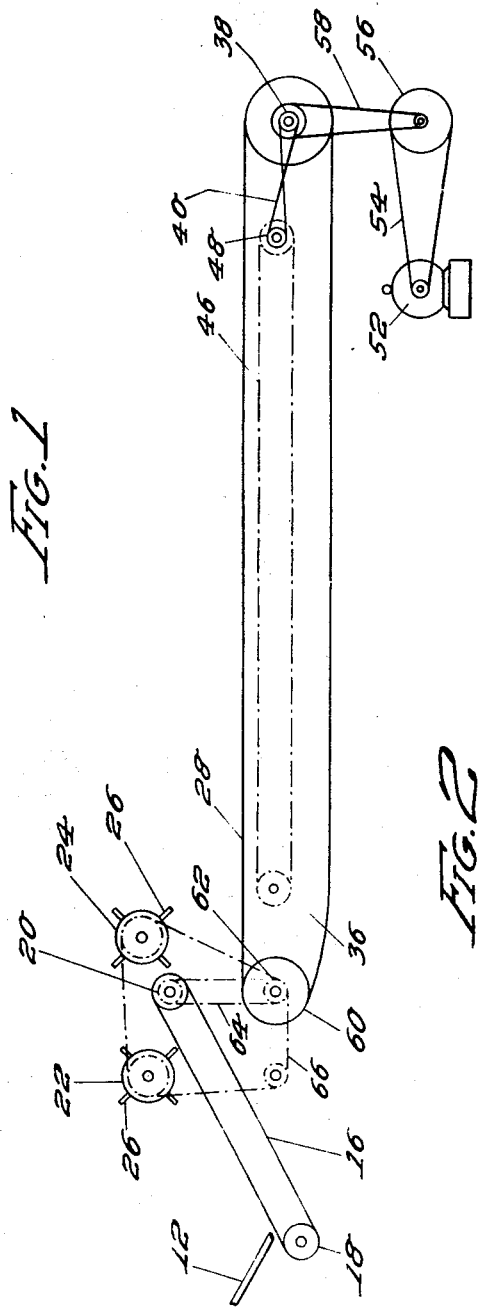
ALBERT M. NYBERG
INVENTOR
PER Munner and Fihe
ATTORNEYS Patented Nov. 21, 1933

1,936,116

UNITED STATES PATENT OFFICE 1,936,116

VEGETABLE GRADER

Albert Matt Nyberg, Brawley, Calif.

Application June 30, 1930. Serial No. 464,772

1 Claim. (Cl. 209—125)

This invention relates to an improved vegetable grader, and has for one of its principal objects the provision of means for the convenient grading or inspection of peas, beans, nuts and the like.

One of the important objects of this invention is to provide a grader for vegetables and similar goods which will automatically spread the vegetables upon a traveling belt for inspection rendering the easy removal of inferior goods and finally delivering the selected product into shipping crates or the like.

Still another important object of the invention is the provision in a grader for vegetables and similar objects of means for automatically disposing of culls or rejected products which disposal means eliminates any interference with the actions or convenience of the operators.

Other and further important objects of the invention will be apparent from the disclosures in the accompanying drawing and following specification.

The inventon, in a preferred form, is illustrated in the drawing and hereinafter more fully described.

In the drawing:

Figure 1 is a top plan view of the improved vegetable grader of this invention, showing particularly the spreader means, the conveyor picking belts, and the conveyor cull belts.

Figure 2 is a side view of the device, supporting portions of the frame being omitted for clarity in showing.

As shown in the drawing:

The reference numerals 10 indicate generally the side bars or frame members of the improved vegetable grader of this invention, these side bars preferably extending longitudinally through the machine and terminating at one end in an inclined intake chute or platform 12 and at the other end in an outlet chute 14, also inclined.

A combined feed and distributing belt 16 is provided for the machine, the same being composed of any suitable material and mounted on rollers 18 and 20, the roller 20 being preferably the drive roller. This feed belt has operating in conjunction therewith a pair of spreading rollers 22 and 24, each roller having a series of staggered projections or teeth 26 thereon which, as the rollers rotate, revolve in close proximity to the feed belt, thereby spreading the vegetables preferably in single layers over the belt from which they are thence dropped onto one end of the main inspection belt 28.

This main inspection belt is separated down its middle by a partition or the like 30, which is simply for the purpose of dividing the products on the belt into two portions for the convenience of the operators at either side of the machine. When the inspection belt passes over the roller 38, any goods thereon are dumped into the chute 14.

In order to properly dispose of culls, a pair of cull belts 46 are provided, one on each side of the machine, these cull belts being indicated by the dot and dash lines in Figure 2, and mounted on rollers 36 and 48 respectively, the roller 48 being driven by a crossed belt 40 from the roller 38, thereby resulting in a rearward travel of the upper surface of the cull belts whereby products placed thereon by operators are delivered to chutes 50 adjacent the middle of the machine from whence they are delivered into suitable containers for disposal.

Any desired or convenient means of operating the machine may be employed, as for example, a motor 52 operating a drive chain or belt 54 which in turn passes over sprockets or gears 56, these driving a chain or the like 58, which rotates the main belt roller 38. This main belt roller in turn operates the rollers 60 and 36. A rotation of the rollers 36 operates the cull belts 46 and their supporting rollers 48.

Rotation of the roller 60 in turn drives sprocket wheels or the like 62 upon which is mounted chains 64 and 66 respectively, the chain 64 operating the roller 20 for the feed belt 16 and the chain 66 operating the spreader rollers 22 and 24 with their attached fingers or prongs 26.

These spreading rollers with their attached fingers operate to spread the vegetables or other material dumped upon the feed belt 16, completely there-across and preferably in single layers so that when the goods are delivered into the inspection belt 28, the culls or imperfect specimens are readily perceived, and it is not necessary for the operators to work through layers of the articles.

The distribution apparatus may be adjusted to permit of fast movement of the goods into the inspection belt and the distributing rollers with their staggered teeth rotate in an opposite direction to that of the feed belt whereby a more even distribution of goods into the conveyor belt is obtained. Extra rollers or other means may be employed for keeping the conveyor belts and cull belts taut, or adjustment of the rollers 32 or 36 may be provided for this purpose.

It will be evident that herein is provided a vegetable grader or the like which primarily distributes goods to be inspected in thin layers for ready work thereupon by operators or inspectors.

Further, the apparatus automatically delivers the goods to shipping crates without additional labor, and additionally, the culls or rejected articles are conveniently and automatically disposed of, thereby eliminating many of the disagreeable features usually attendant upon separation of such products.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A vegetable grader, comprising in combination, a main inspection belt divided in two sections adapted for continuous travel in one direction while the device is in operation, a pair of cull removing belts traveling parallel to the main belt but in an opposite direction and along the sides thereof, a combined feed and distributing belt and associated spreader means at one end of the inspection belt for delivering vegetables thereto in single layers, said spreader means comprising two continuously operated rollers, one above the feed belt and one at the delivery end thereof, a plurality of spreader fingers mounted in each roller and extending radially therefrom along the longitudinal dimension thereof, the longitudinal disposition of said spreader fingers being in rows, the fingers in one row being staggered with relation to the fingers in the adjacent row, said rollers and associated spreader fingers rotating in a direction opposite to the direction of motion of the feed belt, the spreader fingers on each roller adapted to substantially contact the belt at at least one point in their cycle of rotation.

ALBERT MATT NYBERG.